(12) United States Patent
Goswami et al.

(10) Patent No.: US 8,602,720 B2
(45) Date of Patent: Dec. 10, 2013

(54) COMPRESSORS WITH CASING TREATMENTS IN GAS TURBINE ENGINES

(75) Inventors: Shraman Narayan Goswami, Karnataka (IN); Mahmoud Mansour, Phoenix, AZ (US); Hasham Hamzamiyan Chougule, Mumbai (IN)

(73) Assignee: Honeywell International Inc., Morristown, NJ (US)

( * ) Notice: Subject to any disclaimer, the term of this patent is extended or adjusted under 35 U.S.C. 154(b) by 761 days.

(21) Appl. No.: 12/820,941

(22) Filed: Jun. 22, 2010

(65) Prior Publication Data

US 2011/0311354 A1 Dec. 22, 2011

(51) Int. Cl.
*F01D 1/02* (2006.01)

(52) U.S. Cl.
USPC ........ 415/57.4; 415/119; 415/144; 415/173.1; 415/914

(58) Field of Classification Search
USPC ............. 415/119, 173.1, 173.5, 173.6, 174.5, 415/186, 57.4, 144, 208.2, 208.3, 208.5, 415/211.1, 914
See application file for complete search history.

(56) References Cited

U.S. PATENT DOCUMENTS

| | | | |
|---|---|---|---|
| 4,239,452 A * | 12/1980 | Roberts, Jr. | ................. 415/173.5 |
| 4,540,335 A * | 9/1985 | Yamaguchi et al. | .......... 415/129 |
| 5,137,419 A | 8/1992 | Waterman | |
| 5,282,718 A | 2/1994 | Koff et al. | |
| 5,308,225 A | 5/1994 | Koff et al. | |
| 5,520,508 A | 5/1996 | Khalid | |
| 5,607,284 A | 3/1997 | Byrne et al. | |
| 5,707,206 A * | 1/1998 | Goto et al. | ................. 415/173.1 |
| 5,762,470 A * | 6/1998 | Gelmedov et al. | ........... 415/57.4 |
| 6,234,747 B1 | 5/2001 | Mielke et al. | |
| 6,435,819 B2 * | 8/2002 | Irie et al. | ........................ 415/119 |
| 6,719,527 B2 | 4/2004 | Collins | |
| 7,074,006 B1 | 7/2006 | Hathaway et al. | |
| 7,475,539 B2 | 1/2009 | Chen | |
| 2007/0147989 A1 | 6/2007 | Collins | |
| 2007/0196204 A1 | 8/2007 | Seitz | |
| 2007/0212217 A1 | 9/2007 | Northfield | |
| 2007/0237629 A1 | 10/2007 | Moree et al. | |

OTHER PUBLICATIONS

Iyengar, V. et al.; Assessment of the Self-Recirculating Casing Treatment Concept to Axial Compressors, American Institute of Aeronautics and Astronautics, 2005.
Shabbir, A. et al.; Flow Mechanism for Stall Margin Improvement Due to Circumferential Casing Grooves on Axial Compressors, Transactions of the ASME, 2005.

(Continued)

*Primary Examiner* — Igor Kershteyn
(74) *Attorney, Agent, or Firm* — Ingrassia Fisher & Lorenz, P.C.

(57) ABSTRACT

A compressor section includes a rotor platform; a rotor blade extending radially outwardly from the rotor platform, the rotor blade including a pressure sidewall and a circumferentially opposing suction sidewall extending in a radial direction between a root and a tip and in an axial direction between a leading edge and a trailing edge; a casing having an inner surface surrounding the tip and spaced radially outwardly therefrom to define a gap therebetween; a plurality of grooves disposed in the inner surface of the casing and extending in a generally circumferential direction, the plurality of grooves including a first groove and a second groove; and a channel system comprising at least a first channel positioned within the casing and configured to provide fluid communication between the first groove and the second groove.

16 Claims, 4 Drawing Sheets

(56) References Cited

OTHER PUBLICATIONS

Hathaway, M.; Passive Endwall Treatments for Enhancing Stability, NASA/TM-2007-214409, 2007.

Hathaway, M.; Self-Recirculating Casing Treatment Concept for Enhanced Compressor Performance, NASA/TM-2002-211569, 2002.

Prince, D.C. et al.; Study of Casing Treatment Stall Margin Improvement Phenomena, NASA CR-134552, 1974.

* cited by examiner

COMPRESSORS WITH CASING TREATMENTS IN GAS TURBINE ENGINES

TECHNICAL FIELD

The present invention generally relates to compressors of gas turbine engines, and more particularly relates to casing treatments in compressors of gas turbine engines.

BACKGROUND

A gas turbine engine may be used to power various types of vehicles and systems. A gas turbine engine may include, for example, five major sections: a fan section, a compressor section, a combustor section, a turbine section, and an exhaust nozzle section. The fan section induces air from the surrounding environment into the engine and accelerates a fraction of this air toward the compressor section. The remaining fraction of air induced into the fan section is accelerated through a bypass plenum and exhausted through the mixer nozzle. The compressor section raises the pressure of the air it receives from the fan section and directs the compressed air into the combustor section where it is mixed with fuel and ignited. The high-energy combustion products then flow into and through the turbine section, thereby causing rotationally mounted turbine blades to rotate and generate energy. The air exiting the turbine section is exhausted from the engine through the exhaust nozzle section.

In some engines, the compressor section is implemented with one or more axial and/or centrifugal compressors. A compressor typically includes at least one rotor blade that is rotationally mounted on a hub within a casing. The portion of casing in closest proximity to the rotor blades is referred to as the end wall. From a high pressure efficiency perspective, it is advantageous to minimize the distance between the outer tips of the fan blades and the end wall. However, in some conventional engines, minimizing this distance may increase the likelihood of a stall condition. Engine stall is a phenomenon that occurs as a result of certain engine operating conditions and, if not properly addressed, may adversely impact engine performance and durability.

During operation of the compressor, stall occurs when the stream momentum imparted to the air by the blades is insufficient to overcome the pressure rise across the compressor to result in a reduction in airflow. The compressor stall may propagate through several compressor stages, starving the gas turbine of sufficient air to maintain engine speed. This decreases the turbine's ability to create power, further reducing the output of the engine. To avoid stall, operating limits may be placed on the engine to define a safe operating range in which stall is unlikely. The difference between the safe operating limits and a normal or desired operating condition is often referred to as the stall margin. As in many systems, greater efficiency and overall performance are achieved at higher operating conditions, and thus, to that extent, some conventional compressors may sacrifice engine efficiency to obtain safer operating conditions. To maintain adequate stall margin, the compressor must either operate in a less than optimally efficient manner or mechanisms may be devised to extend the stable operating range of the compressor.

Accordingly, it is desirable to provide casing treatments that increase the stall margin while not adversely affecting engine performance. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, a compressor section includes a rotor platform; a rotor blade extending radially outwardly from the rotor platform, the rotor blade including a pressure sidewall and a circumferentially opposing suction sidewall extending in a radial direction between a root and a tip and in an axial direction between a leading edge and a trailing edge; a casing having an inner surface surrounding the tip and spaced radially outwardly thereform to define a gap therebetween; a plurality of grooves disposed in the inner surface of the casing and extending in a generally circumferential direction, the plurality of grooves including a first groove and a second groove; and a channel system comprising at least a first channel positioned within the casing and configured to provide fluid communication between the first groove and the second groove.

In accordance with another exemplary embodiment, a casing treatment is provided for a compressor having a rotor blade with a pressure sidewall and a circumferentially opposing suction sidewall extending in a radial direction between a root and a tip and in an axial direction between a leading edge and a trailing edge. The casing treatment includes an inner wall; a plurality of grooves disposed in the inner wall and extending in a generally circumferential direction, the plurality of grooves including a first groove and a second groove; and a channel system comprising at least a first channel positioned within the inner wall and configured to provide fluid communication between the first groove and the second groove.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Broadly, exemplary embodiments discussed herein provide casing treatments for compressor end walls. The casing treatments include a number of circumferential grooves that are connected via channels to enable fluid communication between the grooves. As such, secondary flows occurring at the blade tip may be removed by the casing treatment and injected in a location that does not impact mainstream air flow to thus improve the stall margin of the compressor.

Figure 1:
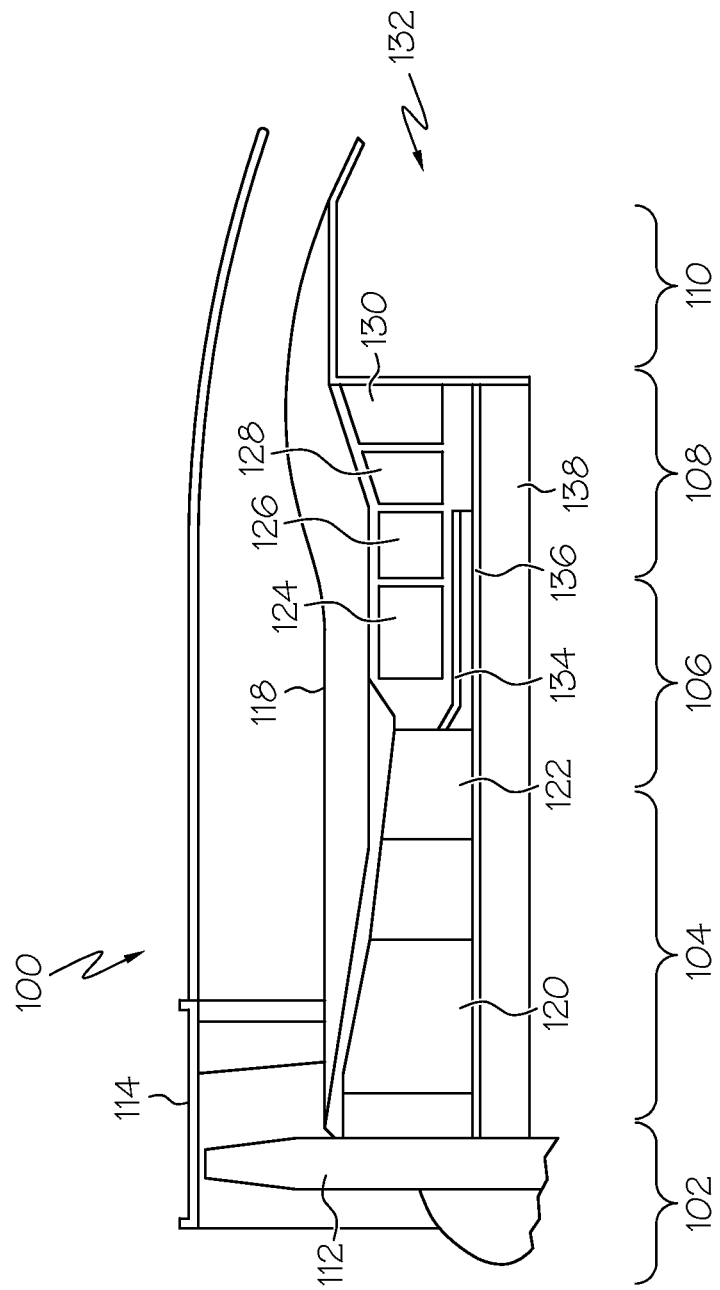
FIG. 1 is a cross-sectional view of a gas turbine engine in accordance with an exemplary embodiment.

FIG. 1 is a cross-sectional view of a gas turbine engine 100 in accordance with an exemplary embodiment. The gas turbine engine 100 includes a fan section 102, a compressor section 104, a combustion section 106, a turbine section 108, and an exhaust section 110. The fan section 102 includes a fan 112 mounted in a fan case 114 that induces and accelerates ambient air into the compressor section 104.

The compressor section 104 includes at least one compressor and, in the depicted embodiment, includes an intermediate pressure compressor 120 and a high pressure compressor 122 that raise the pressure of the air and directs it into the combustion section 106. In the combustion section 106, which includes an annular combustor 124, the high pressure air is mixed with fuel and combusted. The combusted air is then directed into the turbine section 108. The turbine section 108 includes a number of turbines disposed in axial flow series, including a high pressure turbine 126, an intermediate pressure turbine 128, and a low pressure turbine 130. The combusted air from the combustion section 106 expands through each turbine 126, 128, 130, causing them to rotate. As the turbines 126, 128, 130 rotate, each respectively drives equipment in the engine 100 via concentrically disposed shafts or spools 134, 136, 138. The air is then exhausted through the exhaust section 110.

Figure 2:
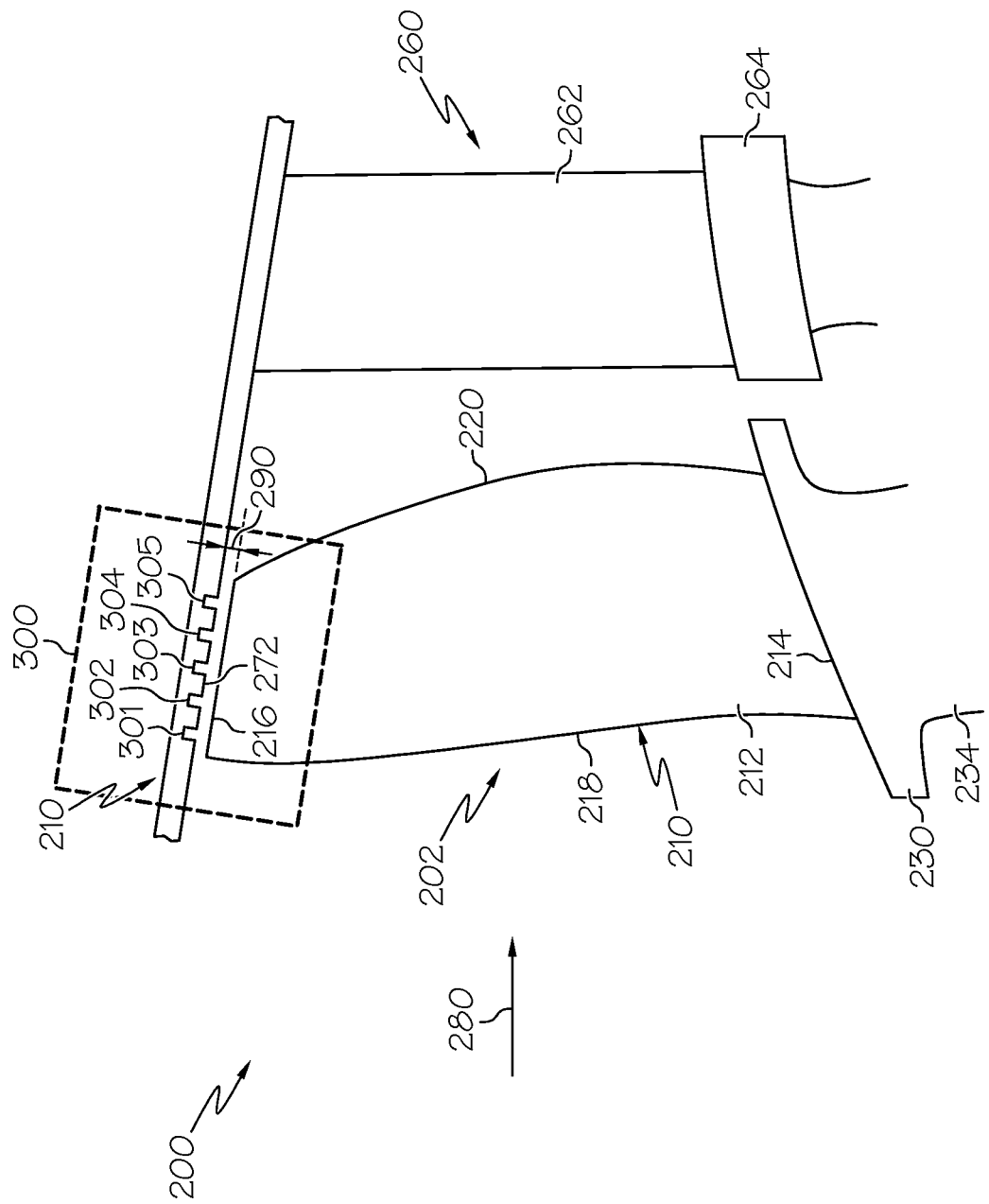
FIG. 2 is a partial cross-sectional view of a compressor of the gas turbine engine of FIG. 1 in accordance with an exemplary embodiment.

FIG. 2 is a partial cross-sectional view of a compressor 200 that may be incorporated, for example, into the compressors 120, 122 discussed above in reference to FIG. 1 or any type of compressors, including those in an auxiliary power unit (APU). In the depicted embodiment, the compressor 200 includes one or more rotor assemblies 202 that each include a number of rotor blades 210 (one of which is shown) mounted on platform 230, which in turn, is coupled to a hub 234 mounted on a shaft (not shown). The blades 210 extend in a radial direction and are generally spaced apart from one another around the circumference of the hub 234. Each rotor blade 210 includes a generally concave, pressure sidewall 212 and a circumferentially opposite, generally convex suction sidewall (not shown). The two sidewalls extend radially between a root 214 and an outer tip 216 and axially between a leading edge 218 and a trailing edge 220. The blade 210 is typically solid and has a plain, generally flat tip 216, although other configurations may be provided.

The compressor 200 further includes one or more stator assemblies 260 with stator vanes 262 (one of which is shown) mounted a platform 264. A generally circumferentially arcuate casing 270 surrounds the rotor blades 210 and stator vanes 262 to at least partially define the compressor flow path with the platforms 230, 264. The portion of casing 270 that is in closest proximity to the blade tip 216 is referred to as an end wall 272. During operation, the rotor assembly 202 rotates, and the rotor blades 210 draw mainstream air 280 through the compressor 200. As the mainstream air 280 flows axially downstream between the blades 210 and the stator vanes 262, it is pressurized and directed through additional compressor or fan stages, as desired, for further compression.

As mentioned above, it is generally advantageous from an efficiency standpoint to minimize a gap 290 between the blade tip 216 of the rotor blade 210 and the end wall 272 of the casing 270 to avoid excess leakage of the mainstream air 280 across the tip 216 of the rotor blade 210. However, conventional compressors may be subject to a stall condition as the gap 290 approaches zero. In such conditions, the air flow between the tips and the end wall may undergo secondary flows, including formation of vortices, that reduce flow momentum of the end wall boundary layer, thus reducing pressure and increasing the likelihood of an undesirable stall. Generally, engine designers determine the mass flow and pressure of operating conditions in which a stall may occur, as well as a stall margin that corresponds to the difference between normal operating conditions and stall operating conditions. As such, it is generally desirable to increase the stall margin either to enable increased normal operating conditions or to increase the margin of safety for existing conditions.

Figure 3:
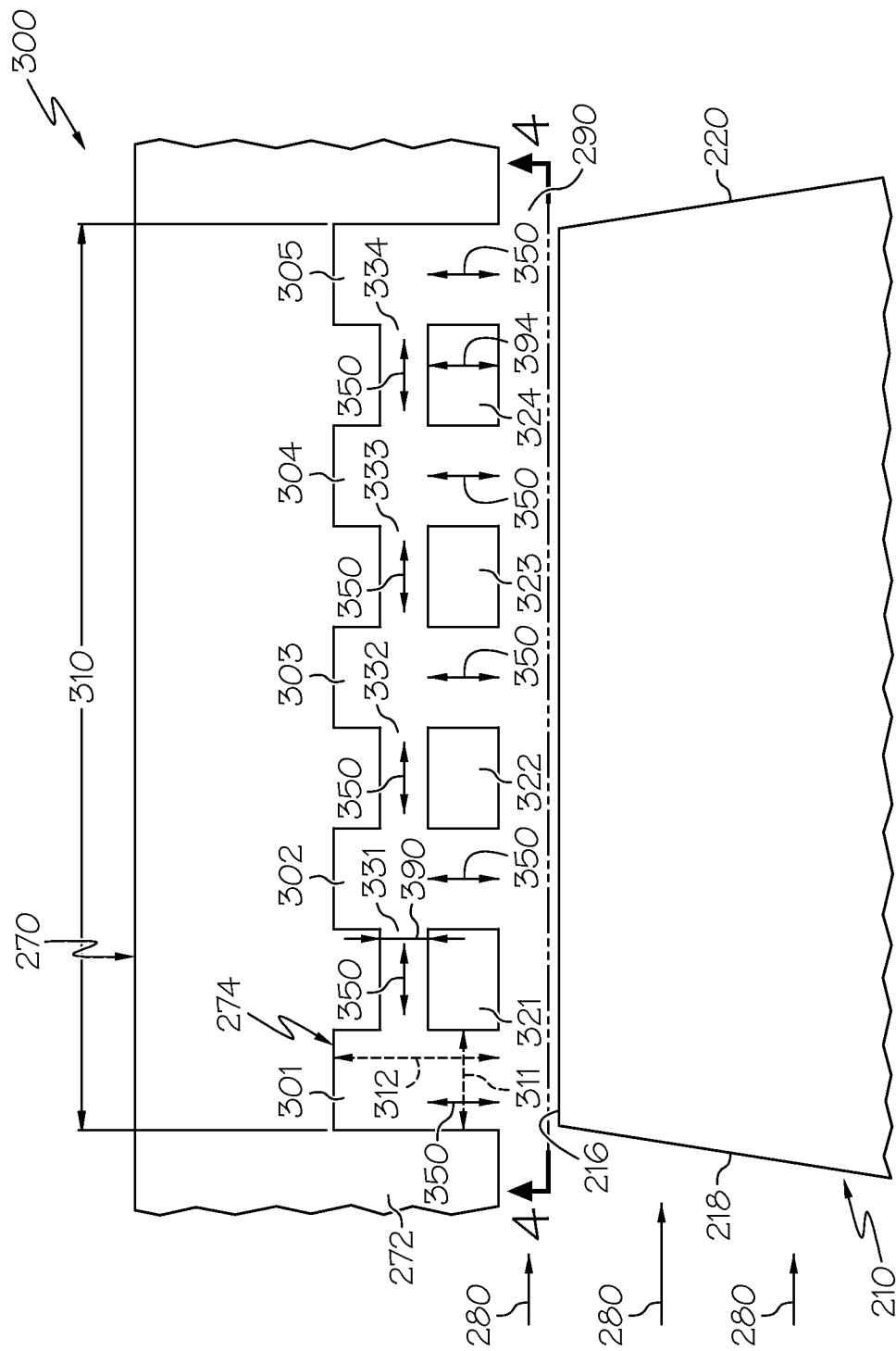
FIG. 3 is a more detailed cross-sectional view of a portion of the compressor of FIG. 2 in accordance with an exemplary embodiment.

One mechanism for increasing the stall margin includes a number of circumferential grooves 301-305 on an inner surface of the end wall 272. The grooves 301-305 are illustrated in greater detail in FIG. 3, which is a cross-sectional view of a portion 300 of the compressor 200 of FIG. 2 in accordance with an exemplary embodiment. In particular, FIG. 3 illustrates the tip 216 of the rotor blade 210 and the end wall 272 of the casing 270. In the exemplary embodiment, the grooves 301-305 include a first groove 301, a second groove 302, a third groove 303, a fourth groove 304, and a fifth groove 305 extending sequentially in a downstream direction. Generally, the extent 310 of the grooves 301-305 corresponds to the length of the blade 210, i.e., from the leading edge 218 to the trailing edge 220, although in other embodiments, the extent 310 of the grooves 301-305 extend from upstream of the leading edge 218 to downstream of the trailing edge 220. Each groove 301-305 may be defined by a length 311, a depth 312 and a width (not shown in FIG. 3). Although the depicted grooves 301-305 extend in a circumferential direction that is perpendicular to the flow of mainstream air 280, the grooves 301-305 may also extend in a general circumferential direction that is not exactly perpendicular, such as in a helical arrangement. Each of the grooves 301-305 is separated from adjacent grooves 301-305 by a circumferential wall or rib 321, 322, 323, 324. The grooves 301-305 are generally inverted U-shaped with a flat bottom, although other embodiments may have different shapes, including rounded bottoms or inverted V-shapes.

The end wall 272 further includes a channel system defined by one or more channels 331-334 that extend in an axial direction, i.e., in a direction parallel to the flow of mainstream air 280, between the grooves 301-305. In the cross-sectional view of end wall 272 of FIG. 3, one channel 331-334 extends between each pair of adjacent grooves 301-305. For example, channel 331 extends between groove 301 and groove 302. As illustrated in FIG. 3, the grooves 301-305 and channels 331-334 provide fluid communication between grooves 301-305 such that air flows 350 circulate into and through the grooves 301-305 and channels 331-334, as discussed in greater detail below. The grooves 301-305 and channels 331-334 may be collectively referred to as an interconnected casing treatment. Such casing treatments may be machined directly into the end wall 272 or designed as a discrete insert into the end wall 272. Although not shown, in some exemplary embodiments, the channels 331-335 extend to the end wall 272 to form a series of cross-hatched grooves.

As noted above, mainstream air 280 within the gap 290 may form secondary flows, such as vortices, that may otherwise disrupt the flow of mainstream air 280 between the tip 216 and end wall 272. However, in the exemplary embodiment, any such occurrences may flow into and out of the grooves 301-305 to avoid disruptions. In particular, individual grooves 301-305 tend to reduce the impact of secondary flows in localized areas. For example, groove 301 tends to prevent secondary flow in the area immediately downstream of the leading edge 218. Additionally, since the grooves 301-305 may communicate with one another via the channels 331-334, the collection of connected grooves 301-305 tends to prevent secondary flows across the length 310 of the tip 216 to a greater extent than a collection of individual grooves. This may be due to the fact that the magnitudes of secondary flow vary along the tip 216. In various areas, it may be advantageous to either inject or bleed air flows 350 from the mainstream air 280. For example, in one exemplary embodiment, air flow 350 captured by groove 305 tends to flow upstream through the channels 331-334 to one or more of the upstream grooves 301-304 before being injected back into the mainstream air 280. As such, air flow 350 may travel from the most downstream groove 305 to the most upstream groove 301 such that air from the trailing edge 320 may be circulated to the leading edge 218.

Figure 4:
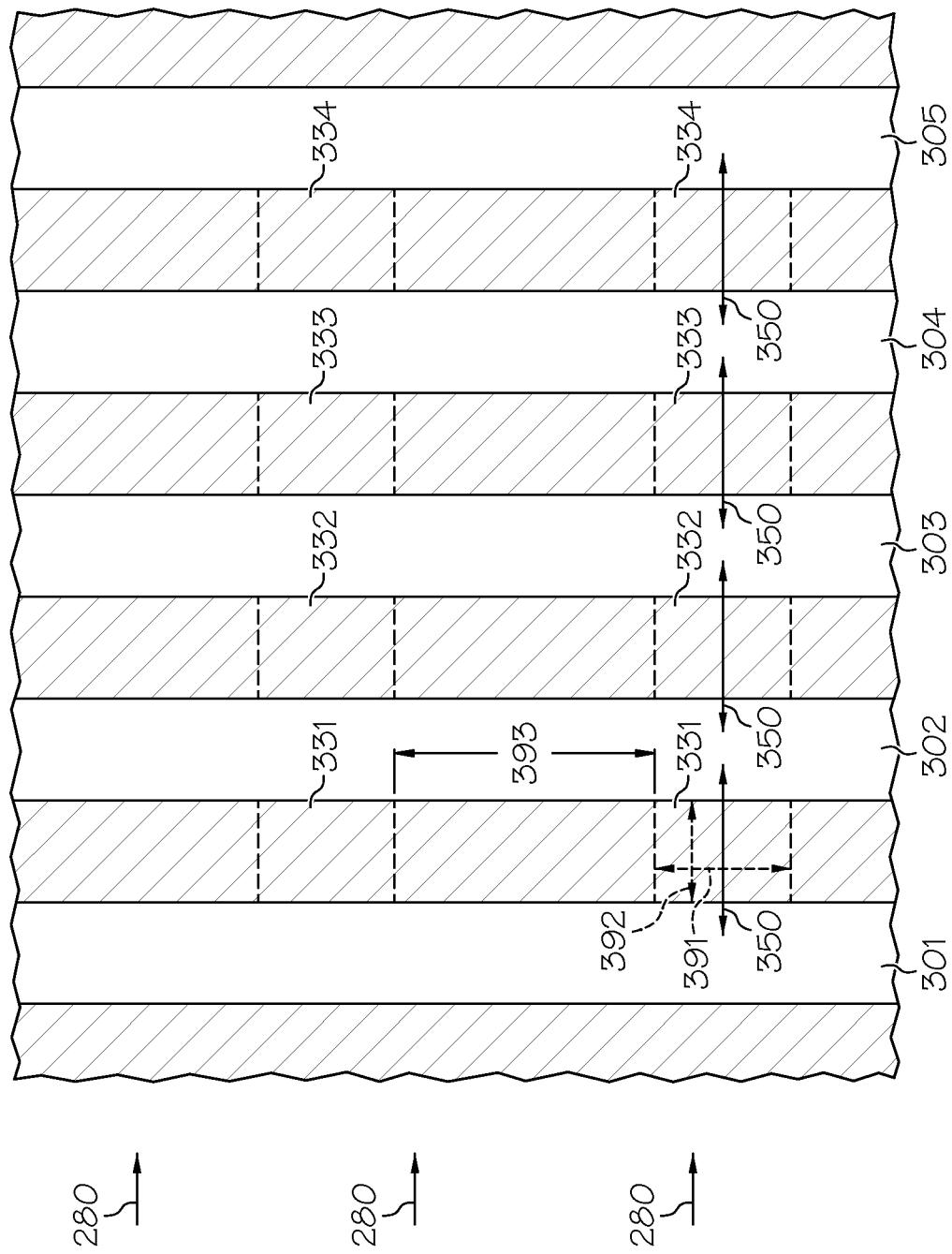
FIG. 4 is a partial view of a portion of the compressor through line 4-4 of FIG. 3.

FIG. 4 is another view of the grooves 301-305 and channels 331-334 from the perspective of line 4-4 in FIG. 3. As shown in FIG. 4, the channels 331-334 may further include additional channels that are circumferentially offset from the channels 331-334 shown in FIG. 3. In general, the channels 331-334 may be in any suitable configuration. For example, FIGS. 3 and 4 depict channel 331 and channel 332 as being circumferentially aligned, although in other configurations, such channels may be circumferentially offset. Similarly, each channel 331-334 may have any suitable height 390 (FIG. 3), width 391, length 392, and separation 393. The channels 331-334 may start at any suitable depth 394 (FIG. 3). Although the cross-sectional shape of the channels 331-334 are depicted as rectangular, any cross-sectional shape may be provided. The depicted channels 331-334 extend in an axial direction, although other configurations may be provided, including those other than axial. Similarly, FIGS. 3 and 4 illustrate that the channels 331-334 and grooves 301-305 are perpendicular to each other, although other configurations may be provided. Design constraints may be determined, for example, with CFD analysis. In general, the particular dimensions and arrangement of the grooves 301-305 and channels 331-334 are selected in order to obtain the proper stall margin without adversely affecting fan performance, as will now be discussed.

The grooves 301-305 and channels 331-334 improve the stall margin by capturing secondary flows, efficiently removing any swirl component, and reintroducing the air back into the flow of mainstream air 280 at a point that results in minimal disturbance. Particularly, the channels 331-334 ensure that this is done in an efficient manner. Air with weak axial flow velocity tends to be captured by the grooves 301-305, selectively recirculated and injected back into the mainstream air 280, while air with strong axial flow velocity tends to remain within the gap 290 and is not captured as flow 350. This tends to avoid recirculating air more than necessary to avoid a detrimental impact to efficiency.

Table 1, below, illustrates an improvement in stall margin for an exemplary casing with grooves and channels, such as that shown in FIGS. 3 and 4, relative to a casing with grooves but no channels.

TABLE 1

| Configuration | Stall Margin |
|---|---|
| Grooves, no Channels | 0.33% |
| Grooves and Channels | 4.02% |

As shown, the exemplary grooves and channels demonstrate a substantially improved margin without a decrease in efficiency. This enables a higher efficiency operation at higher pressures and minimized end wall gaps and/or enhanced safety.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A compressor section, comprising:
   a rotor platform;
   a rotor blade extending radially outwardly from the rotor platform, the rotor blade including a pressure sidewall and a circumferentially opposing suction sidewall extending in a radial direction between a root and a tip and in an axial direction between a leading edge and a trailing edge;
   a casing having an inner surface surrounding the tip and spaced radially outwardly therefrom to define a gap therebetween;
   a plurality of grooves disposed in the inner surface of the casing and extending in a generally circumferential direction, the plurality of grooves including a first groove and a second groove; and
   a channel system comprising at least a first channel positioned within the casing and configured to provide fluid communication between the first groove and the second groove,
   wherein the channel system further includes a second channel and the plurality of grooves further includes a third groove, the second channel configured to provide fluid communication between the second groove and the third groove,
   wherein the first channel is circumferentially aligned with the second channel.

2. The compressor section of claim 1, wherein the first channel extends in the axial direction.

3. The compressor section of claim 1, wherein the first channel extends in a perpendicular direction relative to the first groove and the second groove.

4. The compressor section of claim 1, wherein the channel system further includes a second channel configured to provide fluid communication between the first groove and the second groove at a position circumferentially offset from the first channel.

5. The compressor section of claim 1, wherein the plurality of grooves span the casing from a first position opposing the leading edge to a second position opposing the trailing edge.

6. The compressor section of claim 5, wherein the channel system is configured to provide fluid communication between the first position and the second position.

7. The compressor section of claim 1, wherein the first channel has a rectangular cross-sectional shape.

8. The compressor section of claim 1, wherein the gap includes a high pressure area and a low pressure area, and wherein the plurality of circumferentially extending grooves is configured to capture air in the high pressure area and inject air in the low pressure area via the channel system.

9. A casing treatment for a compressor having a rotor blade with a pressure sidewall and a circumferentially opposing suction sidewall extending in a radial direction between a root and a tip and in an axial direction between a leading edge and a trailing edge, the casing treatment comprising:
- an inner wall;
- a plurality of grooves disposed in the inner wall and extending in a generally circumferential direction, the plurality of grooves including a first groove and a second groove; and
- a channel system comprising at least a first channel positioned within the inner wall and configured to provide fluid communication between the first groove and the second groove,
- wherein the channel system further includes a second channel and the plurality of grooves further includes a third groove, the second channel configured to provide fluid communication between the second groove and the third groove,
- wherein the first channel is circumferentially aligned with the second channel.

10. The casing treatment of claim 9, wherein the first channel extends in the axial direction.

11. The casing treatment of claim 9, wherein the first channel extends in a perpendicular direction relative to the first groove and the second groove.

12. The casing treatment of claim 9, wherein the channel system further includes a second channel configured to provide fluid communication between the first groove and the second groove at a position circumferentially offset from the first channel.

13. The casing treatment of claim 9, wherein the plurality of grooves span the inner wall from a first position opposing the leading edge to a second position opposing the trailing edge.

14. The casing treatment of claim 13, wherein the channel system is configured to provide fluid communication between the first position and the second position.

15. The casing treatment of claim 1, wherein the first channel has a rectangular cross-sectional shape.

16. A compressor section, comprising:
- a rotor platform;
- a rotor blade extending radially outwardly from the rotor platform, the rotor blade including a pressure side and a circumferentially opposing suction side extending in a radial direction between a root and a tip and in an axial direction between a leading edge and a trailing edge;
- a casing having an inner surface surrounding the tip and spaced radially outwardly therefrom to define a gap therebetween;
- a plurality of grooves disposed in the inner surface of the casing and extending in a generally circumferential direction; and
- a channel system disposed within the casing, extending in the axial direction, and configured to provide fluid communication between the plurality of grooves such that secondary flows are captured by the plurality of grooves at a first position, directed between the plurality of grooves via the channel system, and injected out of the plurality of grooves at a second position,
- wherein the channel system includes at least first and second channels and the plurality of grooves further includes at least first, second, and third grooves, the second channel configured to provide fluid communication between the second groove and the third groove,
- wherein the first channel is circumferentially aligned with the second channel.

* * * * *